US009762495B1

(12) United States Patent
Chen et al.

(10) Patent No.: US 9,762,495 B1
(45) Date of Patent: Sep. 12, 2017

(54) WEIGHTED DISTRIBUTION ACROSS PATHS OF DEGRADED QUALITY

(71) Applicant: International Business Machines Corporation, Armonk, NY (US)

(72) Inventors: Hsiu Lan Chen, Beijing (CN); Robert K. Floyd, III, Clemont, FL (US); James W. Ling, McKinney, TX (US); Stephen Sauer, Bois Colombes (FR); Liviu Tudorache, Bucharest (RO)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/264,261

(22) Filed: Sep. 13, 2016

(51) Int. Cl.
*H04L 12/803* (2013.01)
*H04L 12/707* (2013.01)

(52) U.S. Cl.
CPC ............ *H04L 47/125* (2013.01); *H04L 45/22* (2013.01)

(58) Field of Classification Search
CPC .............................. H04L 45/22; H04L 47/125
USPC ......................................................... 370/235
See application file for complete search history.

(56) References Cited

U.S. PATENT DOCUMENTS

| 7,545,744 | B2 | 6/2009 | Zeitak |
| 8,842,674 | B2 * | 9/2014 | Akiyoshi ............... H04L 45/38 370/392 |
| 2004/0136379 | A1 | 7/2004 | Liao et al. |
| 2009/0257351 | A1 * | 10/2009 | Hande ................. H04L 12/5695 370/236 |
| 2011/0261723 | A1 * | 10/2011 | Yamato .................. H04L 45/34 370/255 |

(Continued)

FOREIGN PATENT DOCUMENTS

WO          WO0169851          9/2001

OTHER PUBLICATIONS

"OpenFlow Switch Specification" Open Networking Foundation. Version 1.5.0. Dec. 19, 2014.*
Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Stephen J Clawson
(74) *Attorney, Agent, or Firm* — Heslin Rothenberg Farley & Mesiti P.C.

(57) ABSTRACT

A method, computer program product, and system for adjusting network traffic balance among a plurality of communication links between a first network node and a second network node on a computing network includes a processor receiving over a computing network from a network device, performance metrics for a plurality of communications links between a first network node and a second network node on the computing network and based on receiving the performance metrics, the processor determines degradation in network performance on at least one of the plurality of communication links. The processor determines a weight for each communication link, associating a lower weight with the degraded link(s), and formulates instructions for an adjusted network traffic balance among the links, based on the weights. The processor transmits the instructions to a network device on the computing network and upon receipt of the instructions, the network device adjusts the network traffic balance among the links in accordance with the instructions.

20 Claims, 7 Drawing Sheets

(56) References Cited

U.S. PATENT DOCUMENTS

| | | | |
|---|---|---|---|
| 2011/0286324 A1* | 11/2011 | Bellagamba | H04L 41/0677 370/219 |
| 2011/0317717 A1 | 12/2011 | Scarborough | |
| 2012/0005371 A1* | 1/2012 | Ravindran | H04L 45/50 709/242 |
| 2012/0044813 A1* | 2/2012 | Nandagopal | H04L 45/28 370/242 |
| 2012/0201140 A1* | 8/2012 | Suzuki | H04L 45/22 370/235 |
| 2013/0013667 A1* | 1/2013 | Serena | G06Q 10/10 709/203 |
| 2014/0092738 A1* | 4/2014 | Grandhi | H04L 47/52 370/235 |
| 2014/0198661 A1* | 7/2014 | Raman | H04L 47/125 370/236 |
| 2014/0269305 A1* | 9/2014 | Nguyen | H04L 45/28 370/235 |
| 2015/0029837 A1* | 1/2015 | Ashwood-Smith | H04L 45/34 370/228 |
| 2015/0078166 A1* | 3/2015 | Iwata | H04L 49/50 370/235 |
| 2015/0372902 A1* | 12/2015 | Giorgetti | H04L 45/64 370/219 |
| 2016/0127223 A1* | 5/2016 | Kern | H04L 45/02 370/225 |
| 2016/0342510 A1* | 11/2016 | Pani | G06F 12/0615 |
| 2016/0344620 A1* | 11/2016 | G. Santos | H04L 41/0636 |

* cited by examiner

WEIGHTED DISTRIBUTION ACROSS PATHS OF DEGRADED QUALITY

BACKGROUND

In a distributed environment, such as a data center network, multiple links are bundled together to provide more bandwidth, better redundancy, and higher availability to serve the paths between one node and another node. Algorithms of various networking protocols that define how these computing nodes (i.e., multiple links) in these complex environments work together are primarily based on static attributes of the communication links and are effective if all of the communication links maintain good transmission quality between each other. However, if one or more of the bundled communication links have degraded quality, the distributed environment, as a whole, will experience an increase in transmission errors, which can result in packet loss. Unfortunately, the aforementioned networking algorithms have no capability to adapt to this situation to provide more reliable and stable transmission support.

SUMMARY

Shortcomings of the prior art are overcome and additional advantages are provided through the provision of a computer program product for adjusting network traffic balance among a plurality of communication links between a first network node and a second network node. The computer program product comprises a storage medium readable by a processing circuit and storing instructions for execution by the processing circuit for performing a method. The method includes, for instance: receiving, by one or more processors over a computing network from a network device, performance metrics for a plurality of communications links between a first network node and a second network node on the computing network; based on receiving the performance metrics, determining, by the one or more processors, degradation in network performance on at least one of the plurality of communication links; based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links; formulating, by the one or more processors, instructions for an adjusted network traffic balance among the plurality of communication links, based on the weights associated with the plurality of communication links; and transmitting, by the one or more processors, the instructions to the network device on the computing network, wherein upon receipt of the instructions, adjusting, by the network device, the network traffic balance among the plurality of communication links in accordance with the instructions.

Shortcomings of the prior art are overcome and additional advantages are provided through the provision of a method for adjusting network traffic balance among a plurality of communication links between a first network node and a second network node. The method includes, for instance: receiving, by one or more processors over a computing network from a network device, performance metrics for a plurality of communications links between a first network node and a second network node on the computing network; based on receiving the performance metrics, determining, by the one or more processors, degradation in network performance on at least one of the plurality of communication links; based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links; formulating, by the one or more processors, instructions for an adjusted network traffic balance among the plurality of communication links, based on the weights associated with the plurality of communication links; and transmitting, by the one or more processors, the instructions to the network device on the computing network, wherein upon receipt of the instructions, adjusting, by the network device, the network traffic balance among the plurality of communication links in accordance with the instructions.

Shortcomings of the prior art are overcome and additional advantages are provided through the provision of a system for adjusting network traffic balance among a plurality of communication links between a first network node and a second network node. The system comprises a memory, a processor in communication with the memory, and program instructions executable by the processor via the memory to perform a method. The method includes, for instance: receiving, by one or more processors over a computing network from a network device, performance metrics for a plurality of communications links between a first network node and a second network node on the computing network; based on receiving the performance metrics, determining, by the one or more processors, degradation in network performance on at least one of the plurality of communication links; based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links; formulating, by the one or more processors, instructions for an adjusted network traffic balance among the plurality of communication links, based on the weights associated with the plurality of communication links; and transmitting, by the one or more processors, the instructions to the network device on the computing network, wherein upon receipt of the instructions, adjusting, by the network device, the network traffic balance among the plurality of communication links in accordance with the instructions.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
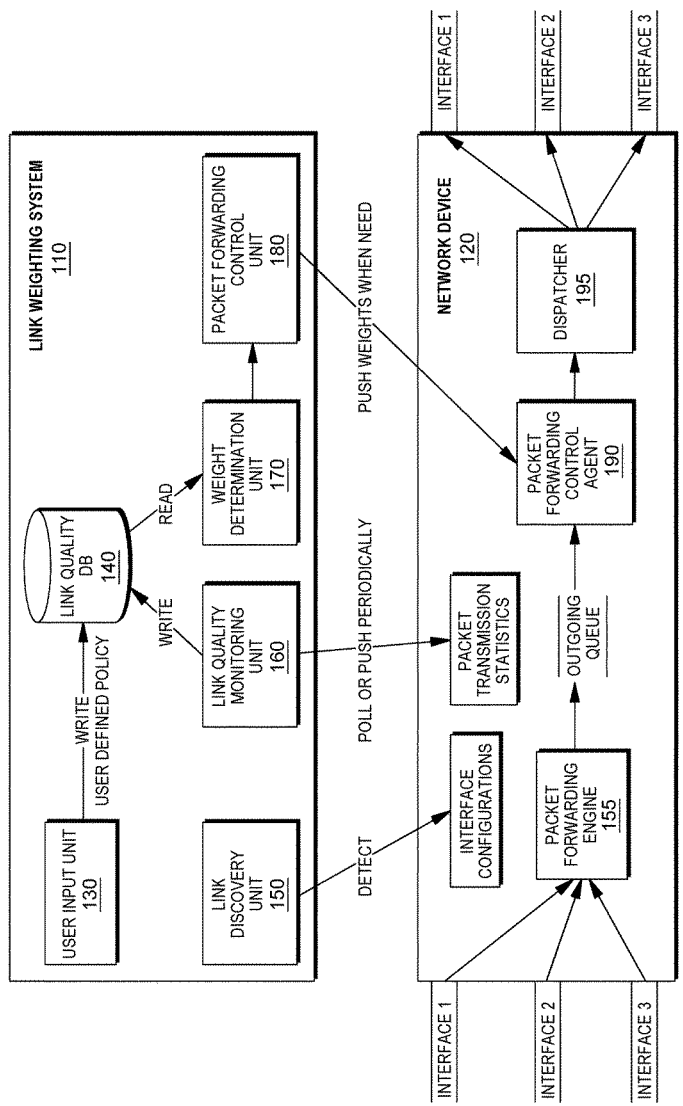
FIG. 1 is a diagram depicting aspects of a technical environment into which aspects of an embodiment of the present technique can be integrated.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
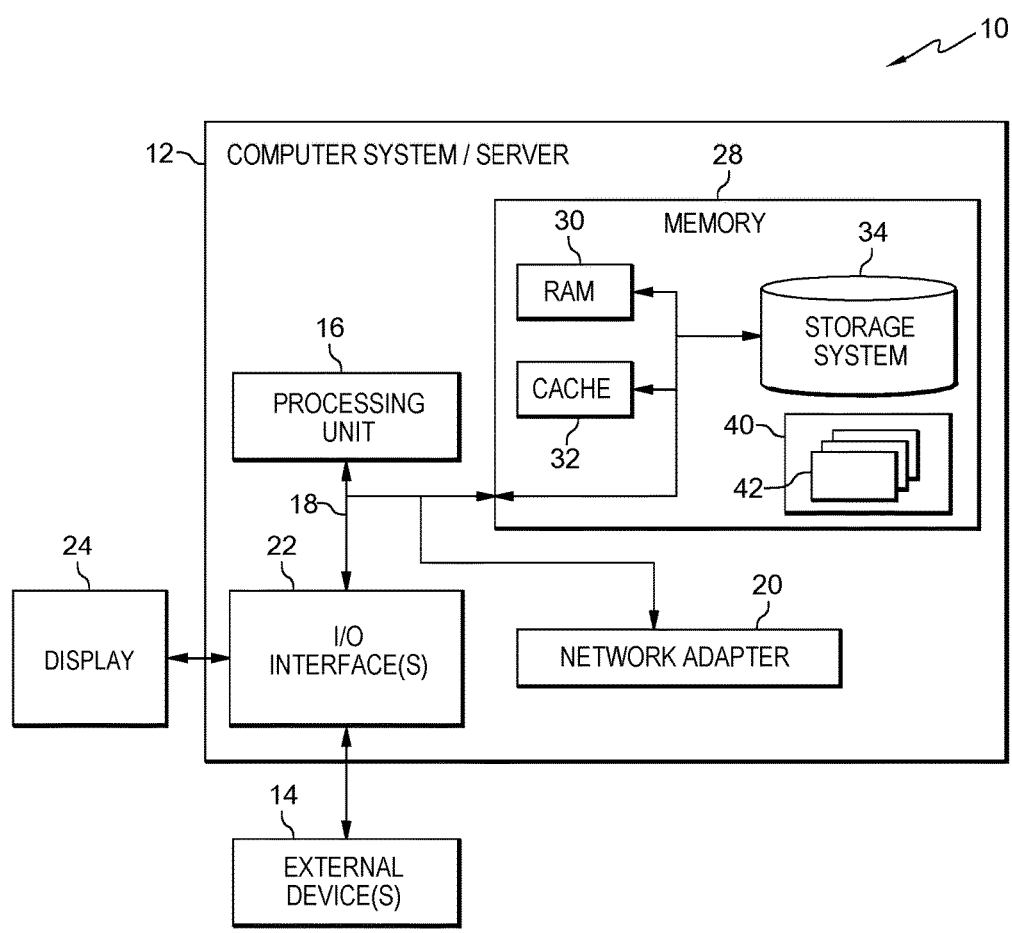
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments if the present invention represent an improvement to communications in multiple-node networks by implementing one or more programs to weight load distribution across these link in this network based on observed error rates. Specifically, certain embodiments of the present invention are directed to adjusting network traffic, dynamically, among multiple links that are bundled together, based on utilizing observed error rates to weight load distribution across these links. Thus, one or more programs in an embodiment of the present invention will load more reliable paths more than less reliable paths. Embodiments of the present invention represent an improvement that is inextricably tied to computer technology because aspects of the these embodiments adapt network paths when one or more of the bundled communication links have degraded in quality, in order to avoid transmission errors and packet loss. Specifically, embodiments of the present invention perform weighted load distribution across these links based on observed error rates. Thus, when multiple links are experiencing errors, the one or more programs in an embodiment of the present invention can weigh load across links based on these observed error rates. Based on the observed error rates, one or more programs can route packets on more reliable paths, while reducing transmissions on reliable paths in a multi-node network.

Certain existing technologies have attempted to address issues with degraded network paths by implementing solutions that address the issue entirely at Open Systems Interconnect (OSI) Layer 1, the physical layer, which is concerned with the transmission and reception of the unstructured raw bit stream over a physical medium. The efficacy of this approach is limited by the activity and data available at this layer. OSI Layer 1 conveys the bit stream through the network at the electrical, optical or radio level and provides the hardware for sending and receiving data on a carrier network. In an approach exclusive to OSI Layer 1, the hardware optimizes transfer rates by monitoring the performance of each individual channel (e.g., receiving over the computing network from a network device, performance metrics for a plurality of communications links between two nodes on the computing network). If the quality degrades, then the bit rate of the bit stream can be reduced on that channel, and possibly reassigned to another channel with a better signal to noise characteristic. In this approach, bandwidth within individual channels can be optimally used with modulation techniques similar to those employed by traditional modems. For example, in xDSL, working at OSI Layer 1, there are mechanisms to detect errors on each frequency/channel the xDSL protocol uses. If a threshold number of errors are detected on the channel, this channel is removed from the bundle.

In contrast to the method described above, which can be utilized exclusively on OSI Layer 1, embodiments of the present invention represent an improvement to computing technology by including aspects that enable weighted load distribution across multiple links of a network and these links may operate at OSI Layer 2 (the data-link layer, e.g., at switching), OSI Layer 3 (the network layer, e.g., at routing), and OSI Layer 4 (the transport layer, e.g., in the session). As understood by one of skill in the art, OSI Layer 2 sets up links across the physical network, putting packets into network frames and has two sub-layers, the Logical Link Control Layer and the Media Access Control Layer. In many networks, Ethernet is a primary data link layer in use. OSI Layer 3 handles the addressing and routing of the data, sending data in the right direction to the right destination on outgoing transmissions, and receiving incoming transmissions at the packet level. Internet Protocol (IP) is the network layer for the Internet. OSI Layer 4 manages packetization of data as well as delivery of the packets, including checking for errors in the data once it arrives. On the Internet, Transmission Control Protocol (TCP) and User Datagram Protocol (UDP) provide these services for many applications.

In an embodiment of the present invention, one or more programs executing at a transmission node evaluates link quality of multiple links within a network based on one or more metrics available during runtime, as observed from the node. Utilizing these metrics, the one or more programs determine a weighted load distribution. In an embodiment of the present invention, the one or more programs may also factor historical baseline data collected by and available from a remote network management system into this determination. In an embodiment of the present invention, the metrics may include, but are not limited to, interface cyclic redundancy check (CRC) error rates, for a Layer 2 link, and packet drop rates (for a Layer 3 link).

In an embodiment of the present invention, one or more programs dynamically adjust network traffic across a plurality of communication links between two network nodes. To accomplish this adjustment, the one or more programs collect network performance metrics for the plurality of communication links between the two network nodes and detect a degradation in network performance for one of the plurality of communication links, based on the collected network error metrics. The one or more programs determine an adjusted network traffic balance among the plurality of communication links, based on weighting factors applied to the network error metrics. The one or more programs then update the routing tables of the network nodes. Updating the routing tables of the network nodes adjusts the network traffic among the plurality of communication links. In an embodiment of the present invention, the one or more programs determine the weighting factors based on a desired network performance level.

FIG. 1 is a diagram illustrating certain aspects of an embodiment of the present invention. In this figure, for ease of understanding, certain of the functionality of one or more programs that perform aspects of certain embodiments of the present invention are portrayed are separate modules. These modules are not indicative of a separation of program code or a set technical architecture, but, rather, are offered as one example of a possible group of programs executing aspects of an embodiment of the present invention, or, alternatively, functionalities that may be executed by one or many programs, in an embodiments of the present invention, as understood by one of skill in the art. The modular representation of the program code in FIG. 1 is done primarily for illustrative purposes to clarify aspects of certain embodiments of the present invention.

FIG. 1 also illustrates how certain aspects of an embodiment of the present invention, encapsulated in this illustration as a link weighting system 110, interacts with aspects of a network device 120 in a multi-node computing network comprised of multiple links that are bundled together.

Although depicted as separate entities for clarity, in some embodiments of the present invention, the link weighing system 110 and the network device 120 may integrated into the same computing node 10 (FIG. 5). In an embodiment of the present invention where the link weighing system 110 and the network device 120 are integrated into a computing node 10 (FIG. 5), one or more programs evaluates link quality of multiple links within a network, based on one or more metrics available during runtime, as observed from on the node 10 (FIG. 5). Utilizing these metrics, the one or more programs determine a weighted load distribution. In this embodiment, rather than the program code (e.g., the packet forwarding control unit 180) communicating the weight instructions to a network device 120, the program code can initiate the weighting of the connections from within the node that comprises the network device 120. For example, the program code may update routing tables in order to initiate routing control in accordance with the weighting.

As illustrated in FIG. 1 an embodiment of the present invention includes a link weighting system 110 comprised of certain units, where each unit may comprise one or more programs and one or more programs may comprise all the units. These aspects, referred to as units, include a user input unit 130, a link discovery unit 150, a link quality monitoring unit 160, a weight determination unit 170, a packet forwarding control unit 180, and a link quality database 140. In this embodiment, the link weighting system 110 communicates with a network device 120 when the one or more programs comprising the packet forwarding control unit 180 communicate with one or more programs comprising a packet forwarding control agent 190 in the network device 120. Within the network device 120, a normal packet flow is handled by one or more programs comprising a packet forwarding engine 155. However, in an embodiment of the present invention, the packet forwarding control agent 190 includes program code that receives instructions from the packet forwarding control unit 180, and then controls a dispatcher 190 in the network device 120 to perform weighted dispatching among the member links.

As illustrated in FIG. 1, in an embodiment of the present invention, program code (e.g., a link discovery unit 150) obtains interface configuration info from managed devices on a network and determines which interfaces to manage (e.g., with link weighting system 110). Once the program code has determined which interfaces it will manage, the program code (e.g., the link quality monitoring unit 160) obtains link quality data from the interfaces being managed and stores the data (e.g., in the link quality database 140). Based on a portion of the data, the program code (e.g., the weight determination unit 170) determines the link (i.e., interface) quality over a period of time on the managed interfaces, and detects if there is any quality degradation on any of these interfaces. In an embodiment of the present invention, the program code (e.g., the weight determination unit 170) utilizes the quality determinations to determine weights for the interfaces for the load distribution and formulates network instructions based on the weights. The program code (e.g., the packet forwarding control unit 180) communicates the weight instructions to a network device 120, for example, to an embedded packet forwarding control agent 190 in the network device 120.

As understood by one of skill in the art, the program code embodied in the link weighting system 110 may communicate with the network device 120 utilizing a variety of different protocols. In an embodiment of the present invention, the program code (e.g., the packet forwarding control unit 180) communicates weight instructions to the network device 120, or, specifically, the packet forwarding control agent 190 using messaging protocols, including but not limited to, Extensible Messaging and Presence Protocol (XMPP). In an embodiment of the present invention, the program code (e.g., the packet forwarding control unit 180) communicates weight instructions to the network device 120, or, specifically, the packet forwarding control agent 190 using OpenFlow as the communication protocol.

In an embodiment of the present invention, in addition to utilizing quality determinations to determine weights for the interfaces, the program code (e.g., the weight determination unit 170) makes this determination also based on user defined policies related to the network. To obtain the user defined policies that factor into this determination, the program code (e.g., the user input unit 130) processes user defined policies that can influence the weight calculation. The program code (e.g., the user input unit 130) may store policies that could impacts link weights in a database for access by the program code when determining the weights. As illustrated in FIG. 1, the user input unit 130 stores the user policies that can affect link weights in the link quality database for access by the weight determination unit 170.

Embodiments of the present invention may include different implementations of the aspects of the invention embodied by the packet forwarding control agent 190 in FIG. 1. For example, in an embodiment of the present invention, the aspects attributed to the packet forwarding control agent 190 may be implemented as a flow table that distributes different flows between the links according to the weights determined by the program code (e.g., the weight determination unit 170).

In an embodiment of the present invention, the one or more programs referred to in FIG. 1 as the packet forwarding control agent 190 may be implemented as a set of dispatching policies as supported by the network device 120.

As aforementioned, unlike prior network management algorithms that rely on static values and operate entirely on OSI Layer 1, embodiments of the present invention control traffic across multiple links in a multi-node network at OSI Layer 2 and OSI Layer 3. To that end, in an embodiment of the present invention, the program code, in an implementation, the packet forwarding engine 155, which is part of the network device 120 receiving instructions from one or more programs in the embodiment, works at OSI layer 2 and the transmission format is an OSI Layer 2 frame. In an OSI Layer 2 implementation, the program code (e.g., the weight determination unit 170) can determine link quality by from the number of cyclic redundancy check (CRC) errors (e.g., as determined by the link quality monitoring unit 160) observed by a sending interface of a first node, communicatively connected to a second node, and the number of CRC errors observed by a receiving interface on the second node. By checking CRC errors, the program code detect accidental changes to raw data as blocks of data get a short check value attached, based on the remainder of a polynomial division of their contents. In an embodiment of the present invention the packet forwarding engine 155 works at OSI Layer 3, the transmission format is an OSI Layer 3 packet, and the program code (e.g., the weight determination unit 170) determines the link quality from the number of packet errors observed by a sending interface. In an embodiment of the present invention, the program code (e.g., the weight determination unit 170) determines the link quality from the difference between the number of packets sent by a sending node and the number of packets received by a receiving node.

Embodiments of the present invention manage network traffic in networks that include multiple links between nodes and adjust the bandwidth among these links. Specifically, embodiments of the present invention may be utilized to adjust bandwidth among multiple egress links, without the need to separately address or handle different types of data categories carried on these links. Embodiments of the present invention allocate bandwidth across a group of communication links, rather than among a group of data flows.

Figure 2A:
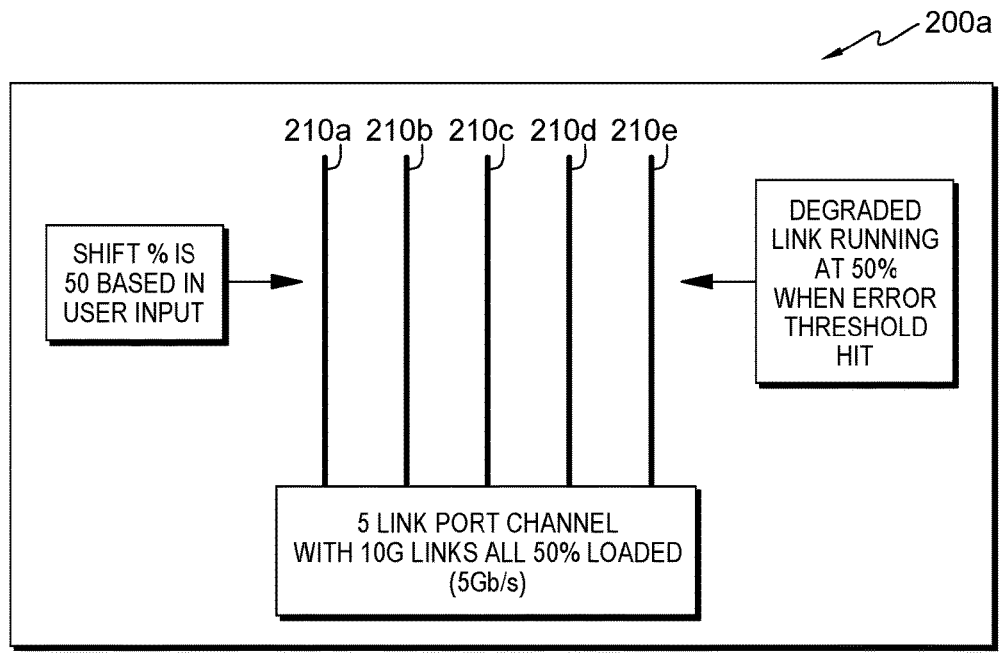
FIGS. 2A-2B depict certain aspects of an embodiment of the present invention.
Figure 2B:
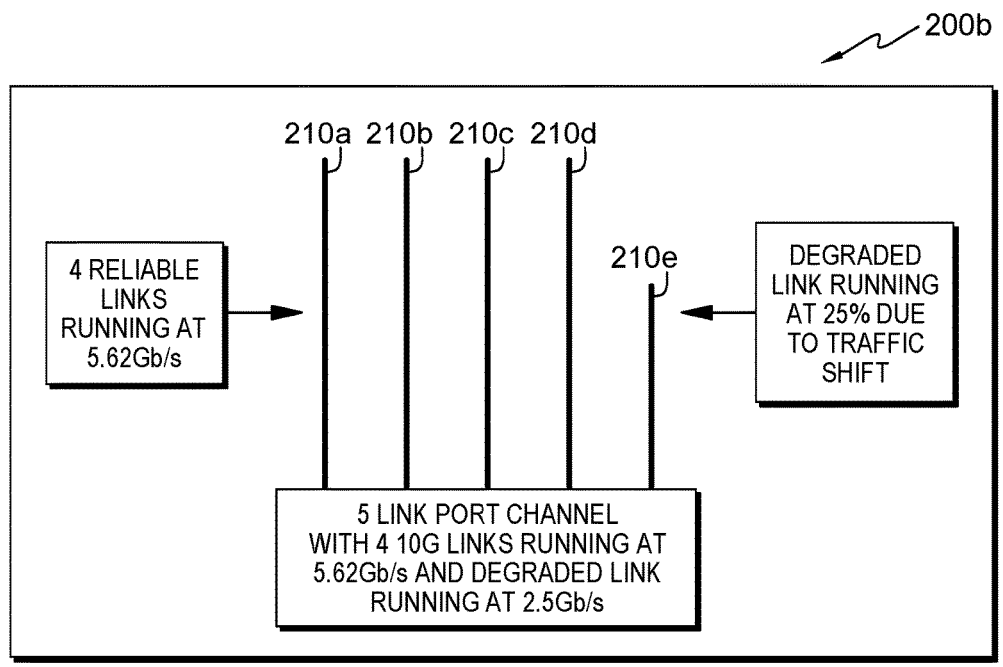

FIGS. 2A-2B demonstrate illustrate a scenario when one or more programs in an embodiment of the present invention allocates bandwidth across multiple links, based on determining that a given link should receive a lower weight due to the observed degradation of this path. FIG. 2A illustrates a 5 Link Port Channel 200a, at time t1, i.e., before an embodiment of the present invention re-allocates bandwidth among the channels based on determining a path has degraded quality. FIG. 2B illustrates 5 Link Port Channel 200b, at time t2, i.e., after an embodiment of the present invention re-allocates bandwidth among the channels based on weighting the paths based on transmission quality.

As illustrated in FIG. 2A, a 5 Link Port Channel 200a includes 10G links 210a-210e all 50% loaded (5 Gb/s). The program code (e.g., the user input unit 130, FIG. 1) obtained a user defined policy defining a shift percent of fifty. The program code may obtain this policy via user input. In an embodiment of the present invention, the program code (e.g., the link quality monitoring unit 160, FIG. 1) monitors the links and determines that among the links is a degraded link 210e that is running at 50% that has degraded to a point that the quality of the link has reached a given error threshold, necessitating the reallocation of bandwidth. The program code (e.g., the weight determination unit 170, FIG. 1) determines the weight for the degraded link and sends instructions (e.g., via the packet forwarding control unit 180) to the 5 Link Port Channel 200a to change the allocations.

Referring to FIG. 2B, the 5 Link Port Channel 200b has received the instructions (e.g., via a packet forwarding control agent 190, FIG. 1) and adjusted the traffic of the links 210a-210e. Specifically, based on the weight instructions, the degraded link 210e is running at 25%. Thus, the 5 Link Port Channel 200b includes four reliable links 210a-210d running at 5.62 Gb/s and a degraded link 210e running at 2.5 Gb/s.

Figure 3:
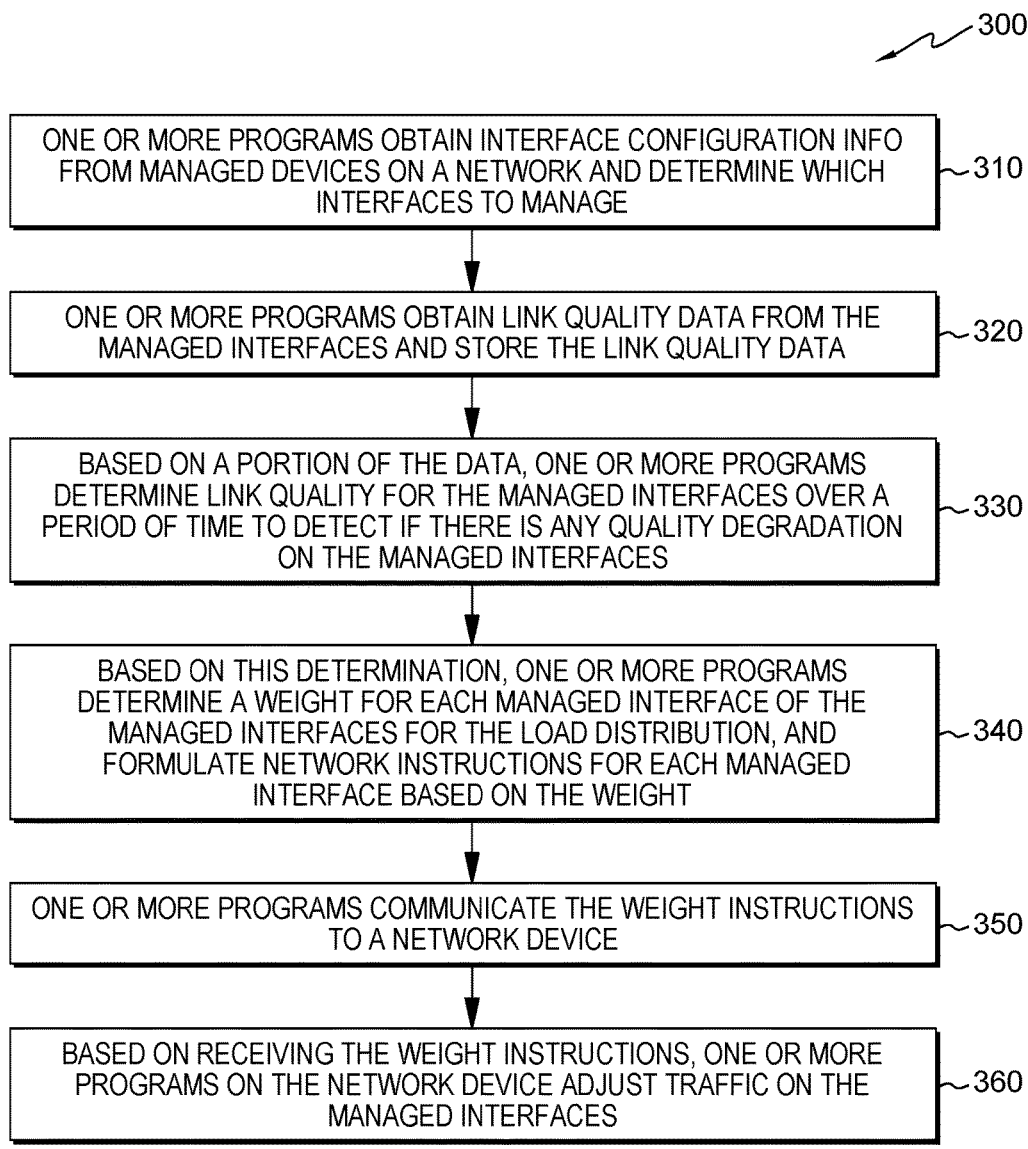
FIG. 3 depicts a workflow illustrating certain aspects of an embodiment of the present invention.

FIG. 3 is a workflow 300 illustrating certain aspects of an embodiment of the present invention. Throughout the description of the workflow 300, references are made to elements of FIG. 1 to aid in the illustration of the workflow 300. The workflow 300 should not be interpreted as limited to the embodiment of FIG. 1.

Referring to FIG. 3, in an embodiment of the present invention, program code (e.g., a link discovery unit 150, FIG. 1) obtains interface configuration info from managed devices on a network and determines which interfaces to manage (310). The program code (e.g., the link quality monitoring unit 160, FIG. 1) obtains link quality data from the interfaces being managed and stores the data (e.g., in the link quality database 140, FIG. 1) (320). Based on a portion of the data, the program code (e.g., the weight determination unit 170, FIG. 1) determines link quality for the managed interfaces over a period of time to detect if there is any quality degradation on the managed interfaces (330). Based on this determination, for each managed interface, the program code (e.g., the weight determination unit 170, FIG. 1) determines a weight for the interfaces for the load distribution, and formulates network instructions for each interface based on the weight (340). The program code (e.g., the packet forwarding control unit 180, FIG. 1) communicates the weight instructions to a network device (350) and based on receiving the weight instructions, program code executing on the network device adjusts traffic on the managed interfaces (360).

Figure 4:
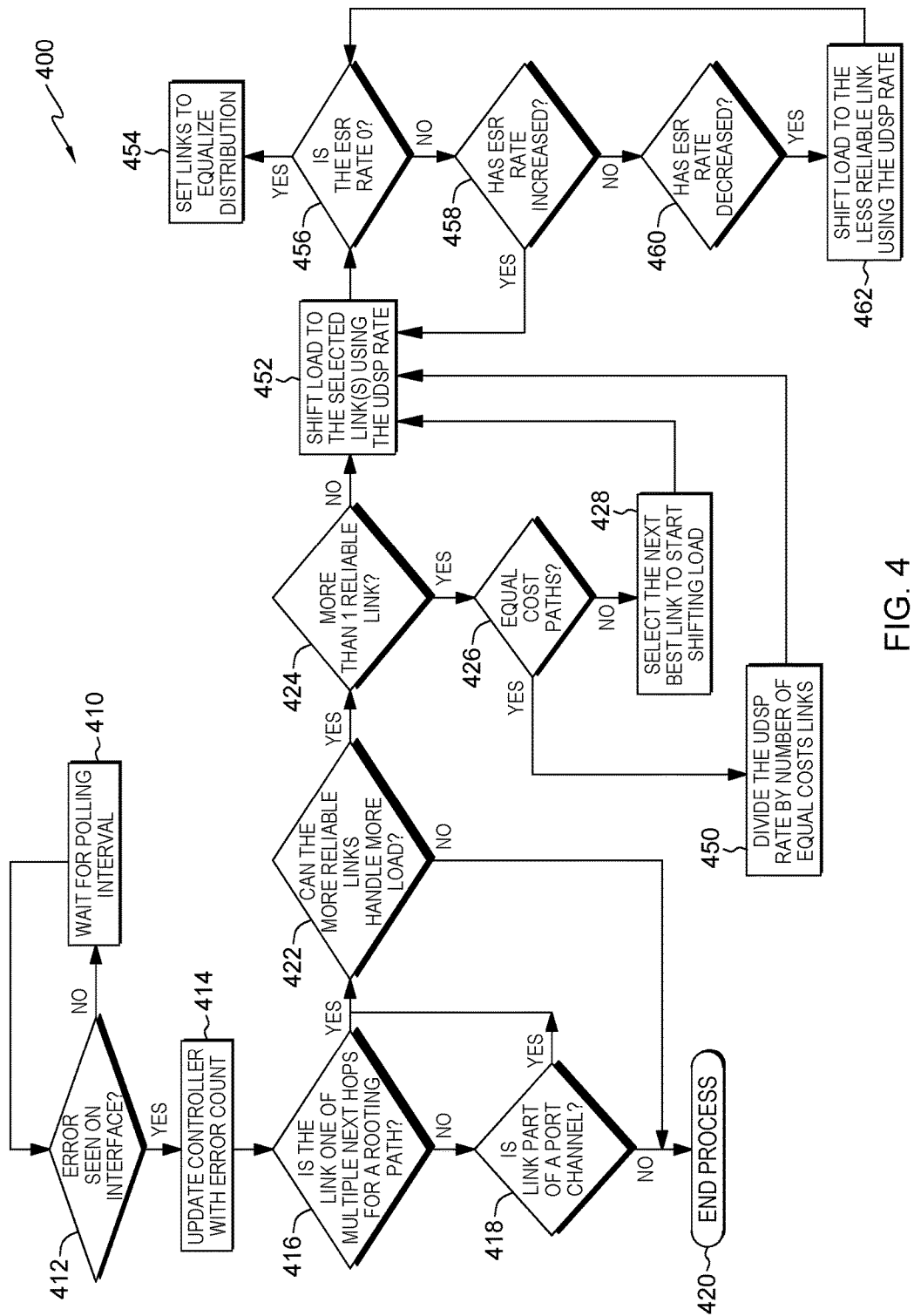
FIG. 4 depicts a workflow illustrating certain aspects of an embodiment of the present invention.

FIG. 4 is a workflow 400 of an embodiment of the present invention. In an embodiment of the present invention, program code executing on one or more processors polls managed interfaces in a network at pre-defined intervals (410). At each interval, if the program code determined that there is an error on an interface (412), the program updates a controller on the network with an error count (414). The program code then determines if a link, upon which the program code has determined errors are occurring, is one of multiple next hops for a routing path (416). If not, the program code then determined is the link is part of a port channel (418). If the program code determined that the link is not part of a port channel, the inquiry ends (420). Meanwhile, in an embodiment of the present invention, if the program code determines that the link is either one of multiple next hops for a routing path (416) or part of a port channel (418), the program code determines is one of the more reliable links (given that this link has experienced errors) can handle more load, so that the load on this link can be adjusted (422). If the program code determines that no other link could potentially handle a greater load, to compensate for the degraded quality of this link, the inquiry ends (420).

In an embodiment of the present invention, if the program code determined that another link can handle a greater load (422), the program code then determines whether there is more than one reliable link that can handle this additional load (424). If the program code determines that there is more than one reliable link, the program code analyzes each potential link to determine whether the paths have an equal cost (426). When the program code determines that the costs of the paths are not equal (426), the program code selects the next best link to start shifting the load (428) and shifts the load to the selected link using the UDSP rate (452). When the program code determines that the costs of the paths are equal (426), the program code divides the UDSP rate by the number of equal cost links (428) and shifts the load to the selected links using the UDSP rate (452).

In an embodiment of the present invention, the program code monitors the links to determine if the ESR rate is zero (456). If it is, the program code sets the links to equalize distribution, as the degraded link is no longer problematic and can handle a full load (454). If the rate is not zero, the program code determines if the rate has increased (458) and if so, continues to shift the load to selected link(s) using the UDSP rate (452). In the event that the program code determines that the ESR rate has decreased, the program code shifts load to the less reliable link using the UDSP rate (462).

Certain embodiments of the present invention include a method, computer program product, and computer system that include one or more processors receiving, over a computing network from a network device, performance metrics for a plurality of communications links between a first network node and a second network node on the computing network. Based on receiving the performance metrics, the one or more processors determine degradation in network performance on at least one of the plurality of communication links. Based on the performance metrics, the one or more processors determine a weight for each one of the plurality of communication links, where a respective weight associated with the at least one of the plurality of communication links with the degradation indicates a lower quality connection than a respective weight associated with another communication link of the plurality of communication links. The one or more processors formulate instructions for an adjusted network traffic balance among the plurality of communication links, based on the weights associated with the plurality of communication links. The one or more processors transmit the instructions to a network device on the computing network, where upon receipt of the instructions, the network device adjusts the network traffic balance among the plurality of communication links in accordance with the instructions.

In an embodiment of the present invention, when the one or more processors transmit the instructions to the network device, the one or more processors update routing tables of the first network node and the second network node.

In an embodiment of the present invention, the degradation in network performance on the at least one of the plurality of communication links includes errors on the at least one of the plurality of communication links exceeding a pre-defined error threshold.

In an embodiment of the present invention, one or more processors, prior to the receiving the performance metrics, obtain, from the first network node and the second network node, configuration information related to the plurality of communication links, and based on configuration information, determine that plurality of communication links comprise managed interfaces on the computing network.

In an embodiment of the present invention, adjusting the network traffic balance among the plurality of communication links includes the one or more processors adjusting bandwidth among the plurality of communication links.

In an embodiment of the present invention, receiving the performance metrics includes compiling a first number of cyclic redundancy check errors observed by a sending interface of the first network node and a second number of cyclic redundancy check errors observed by a receiving interface of the second network node to detect accidental changes to raw data across the plurality of communication links, and the one or more processors determining degradation includes the one or more processors detecting a threshold number of accidental changes to raw data on the at least one of the plurality of communication links.

In an embodiment of the present invention, receiving the performance metrics includes the one or more processors monitoring packets on the at least one of the plurality of communication links by compiling a first number of packets observed on by a sending interface of the first network node and a second number of packets received by a receiving interface of the second network node, and the one or more processors determining degradation includes the one or more processors detecting a difference equal to a threshold value between first number of packets and the second number of packets.

In an embodiment of the present invention, when receiving the performance metrics, the one or more processors monitor the plurality of communication links by poll the plurality of communication links at a fixed interval.

In an embodiment of the present invention, the one or more processors transmit instructions in an Open Systems Interconnect Layer 2 transmission format in an Open Systems Interconnect Layer 2 frame.

In an embodiment of the present invention, the one or more processors transmit instructions in an Open Systems Interconnect Layer 3 transmission format in an Open Systems Interconnect Layer 3 frame.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, both the link weighting system 110 (FIG. 1) can be understood as cloud computing node 10 (FIG. 5) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
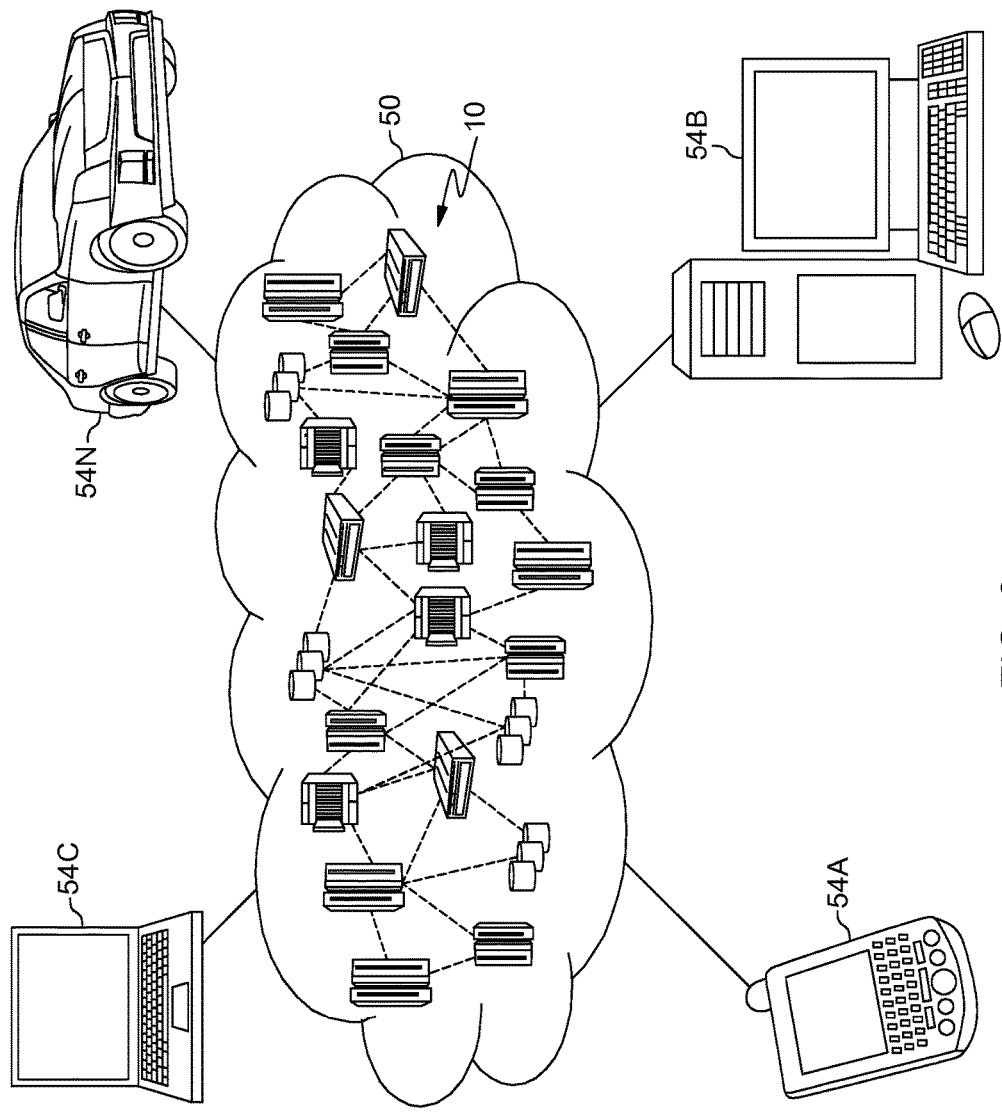
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
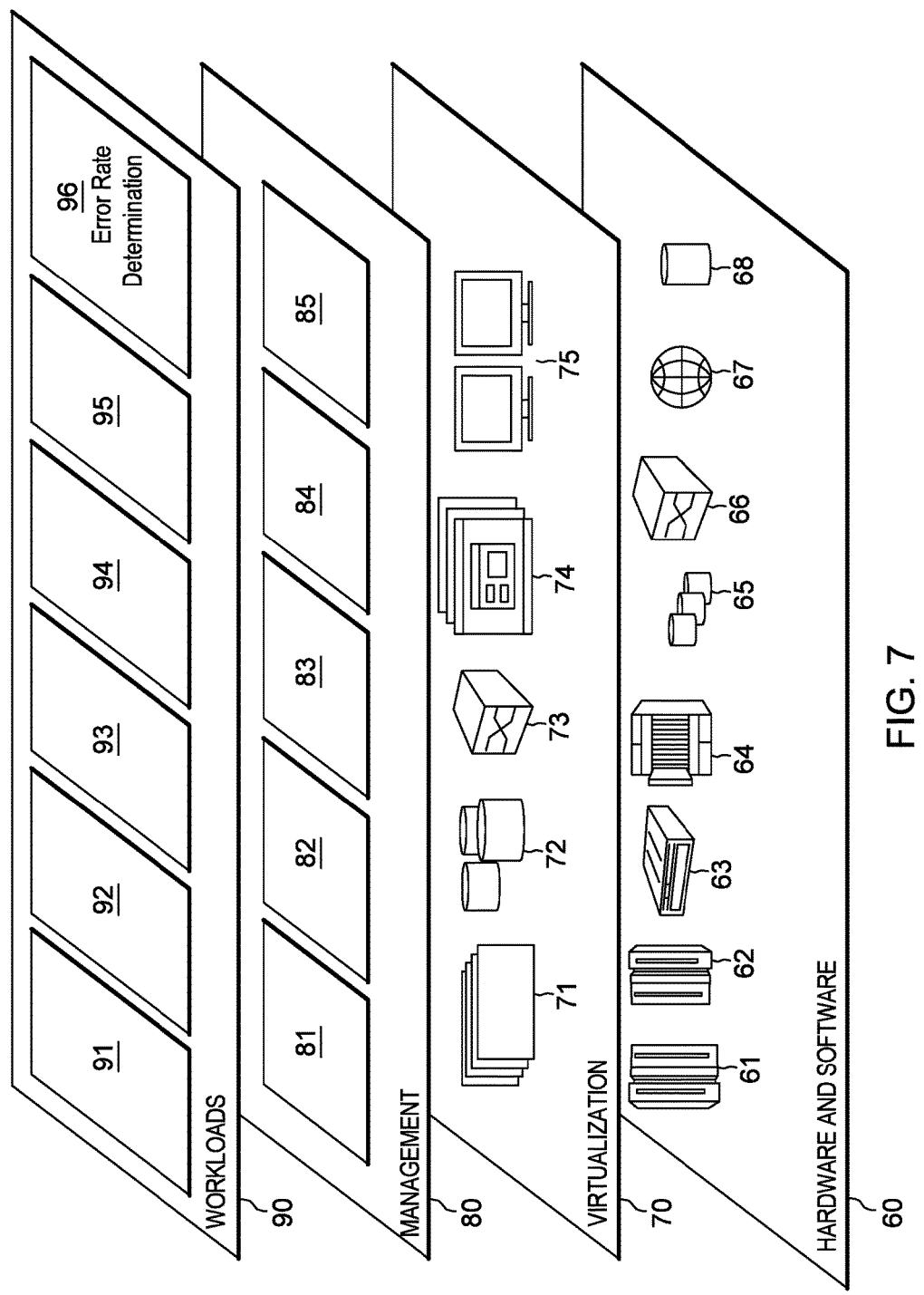
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining error rates on managed interfaces in a computing network 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
receiving, by one or more processors over a computing network from a network device, performance metrics for a plurality of communications links between a first network node and a second network node on the computing network;
based on receiving the performance metrics, determining, by the one or more processors, degradation in network performance on at least one of the plurality of communication links;
based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links;
formulating, by the one or more processors, instructions for an adjusted network traffic balance among the plurality of communication links, based on the weights associated with the plurality of communication links; and
transmitting, by the one or more processors, the instructions to the network device on the computing network, wherein upon receipt of the instructions, adjusting, by the network device, the network traffic balance among the plurality of communication links in accordance with the instructions.

2. The computer-implemented method of claim 1, wherein transmitting the instructions to the network device comprises updating routing tables of the first network node and the second network node.

3. The computer implemented method of claim 1, wherein the degradation in network performance on the at least one of the plurality of communication links comprises errors on the at least one of the plurality of communication links exceeding a pre-defined error threshold.

4. The computer implemented method of claim 1, further comprising:
prior to the receiving, obtaining, by the one or more processors, from the first network node and the second network node, configuration information related to the plurality of communication links, and based on configuration information, determining that plurality of communication links comprise managed interfaces on the computing network.

5. The computer-implemented method of claim 1, wherein the adjusting the network traffic balance among the plurality of communication links comprises adjusting bandwidth among the plurality of communication links.

6. The computer-implemented method of claim 1, wherein the receiving comprises compiling a first number of cyclic redundancy check errors observed by a sending interface of the first network node and a second number of cyclic redundancy check errors observed by a receiving interface of the second network node to detect accidental changes to raw data across the plurality of communication links, and wherein the determining degradation comprises detecting a threshold number of accidental changes to raw data on the at least one of the plurality of communication links.

7. The computer-implemented method of claim 1, wherein the receiving comprises monitoring packets on the at least one of the plurality of communication links by compiling a first number of packets observed on by a sending interface of the first network node and a second number of packets received by a receiving interface of the second network node, and wherein the determining degradation comprises detecting a difference equal to a threshold value between first number of packets and the second number of packets.

8. The computer-implemented method of claim 1, wherein the receiving comprises polling, by the one or more processors, the plurality of communication links at a fixed interval.

9. The computer-implemented method of claim 1, wherein the transmitting comprises transmitting in an Open Systems Interconnect Layer 2 transmission format in an Open Systems Interconnect Layer 2 frame.

10. The computer-implemented method of claim 1, wherein the transmitting comprises transmitting in an Open Systems Interconnect Layer 3 transmission format in an Open Systems Interconnect Layer 3 frame.

11. A computer program product comprising:
a non-transitory computer readable storage medium readable by one or more processors and storing instructions for execution by the one or more processors for performing a method comprising:
receiving, by one or more processors over a computing network from a network device, performance metrics for a plurality of communications links between a first network node and a second network node on the computing network;
based on receiving the performance metrics, determining, by the one or more processors, degradation in network performance on at least one of the plurality of communication links;
based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links;
formulating, by the one or more processors, instructions for an adjusted network traffic balance among the plurality of communication links, based on the weights associated with the plurality of communication links; and
transmitting, by the one or more processors, the instructions to the network device on the computing network, wherein upon receipt of the instructions, adjusting, by the network device, the network traffic balance among the plurality of communication links in accordance with the instructions.

12. The computer program product of claim 11, wherein transmitting the instructions to the network device comprises updating routing tables of the first network node and the second network node.

13. The computer program product of claim 11, wherein the degradation in network performance on the at least one of the plurality of communication links comprises errors on the at least one of the plurality of communication links exceeding a pre-defined error threshold.

14. The computer program product of claim 11, further comprising:
prior to the receiving, obtaining, by the one or more processors, from the first network node and the second network node, configuration information related to the plurality of communication links, and based on configuration information, determining that plurality of communication links comprise managed interfaces on the computing network.

15. The computer program product of claim 11, wherein the adjusting the network traffic balance among the plurality of communication links comprises adjusting bandwidth among the plurality of communication links.

16. The computer program product of claim 11, wherein the receiving comprises compiling a first number of cyclic redundancy check errors observed by a sending interface of the first network node and a second number of cyclic redundancy check errors observed by a receiving interface of the second network node to detect accidental changes to raw data across the plurality of communication links, and wherein the determining degradation comprises detecting a threshold number of accidental changes to raw data on the at least one of the plurality of communication links.

17. The computer program product of claim 11, wherein the receiving comprises monitoring packets on the at least one of the plurality of communication links by compiling a first number of packets observed on by a sending interface of the first network node and a second number of packets received by a receiving interface of the second network node, and wherein the determining degradation comprises detecting a difference equal to a threshold value between first number of packets and the second number of packets.

18. The computer program product of claim 11, wherein the receiving further comprises polling, by the one or more processors, the plurality of communication links at a fixed interval.

19. The computer program product of claim 11, wherein the transmitting comprises on of:
   transmitting in an Open Systems Interconnect Layer 2 transmission format in an Open Systems Interconnect Layer 2 frame; or
   transmitting in an Open Systems Interconnect Layer 3 transmission format in an Open Systems Interconnect Layer 3 frame.

20. A system comprising:
a memory;
one or more processors in communication with the memory; and
program instructions executable by the one or more processors via the memory to perform a method, the method comprising:
   receiving, by one or more processors over a computing network from a network device, performance metrics for a plurality of communications links between a first network node and a second network node on the computing network;
   based on receiving the performance metrics, determining, by the one or more processors, degradation in network performance on at least one of the plurality of communication links;
   based on the performance metrics, determining, by the one or more processors, a weight for each one of the plurality of communication links, wherein a respective weight associated with the at least one of the plurality of communication links with the degradation indicates a lower quality connection than a respective weight associated with another communication link of the plurality of communication links;
   formulating, by the one or more processors, instructions for an adjusted network traffic balance among the plurality of communication links, based on the weights associated with the plurality of communication links; and
   transmitting, by the one or more processors, the instructions to the network device on the computing network, wherein upon receipt of the instructions, adjusting, by the network device, the network traffic balance among the plurality of communication links in accordance with the instructions.

* * * * *